(12) United States Patent
Patel et al.

(10) Patent No.: US 12,227,163 B1
(45) Date of Patent: Feb. 18, 2025

(54) MODEL-BASED ENGINE SPEED PROFILING TECHNIQUES FOR IMPROVED HYBRID POWERTRAIN SYNCHRONIZATION

(71) Applicant: FCA US LLC, Auburn Hills, MI (US)

(72) Inventors: Nadirsh D Patel, Farmington Hills, MI (US); Christian Rostiti, Sterling Heights, MI (US); Ameya Basutkar, Auburn Hills, MI (US); Abdulquadri Banuso, Ottawa (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/514,058

(22) Filed: Nov. 20, 2023

(51) Int. Cl.
*B60W 10/06* (2006.01)
*B60W 10/02* (2006.01)
*B60W 10/08* (2006.01)
*B60W 20/40* (2016.01)

(52) U.S. Cl.
CPC ............ *B60W 10/06* (2013.01); *B60W 10/02* (2013.01); *B60W 10/08* (2013.01); *B60W 20/40* (2013.01); *B60W 2510/0638* (2013.01); *B60W 2710/0644* (2013.01)

(58) Field of Classification Search
CPC ...... B60W 10/06; B60W 10/08; B60W 20/40; B60W 2510/0638; B60W 10/02; B60W 2510/081; B60W 2510/1015; B60W 2710/0644; B60W 2030/203; B60W 2030/206; B60W 20/17; F02N 11/00; F02N 11/003; F02N 2200/022; F02N 2300/102; F02N 2300/2008
USPC ..................................... 477/5; 701/101, 110
See application file for complete search history.

(56) References Cited

U.S. PATENT DOCUMENTS

| 8,131,452 B2 * | 3/2012 | Senda ................ F02N 11/0855 |
| | | 701/113 |
| 8,731,753 B2 | 5/2014 | Smith et al. |
| 9,108,614 B2 | 8/2015 | Doering et al. |
| 9,108,632 B2 | 8/2015 | Gibson et al. |

(Continued)

FOREIGN PATENT DOCUMENTS

GB 2590960 A * 7/2021 ............... B60K 6/48

OTHER PUBLICATIONS

"Modelling and control of hybrid electric vehicles (a comprehensive review)", Renewable and Sustainable Energy Reviews, vol. 74, RSER-D-16-01913R1, pp. 1210-1239. https://doi.org/10.1016/j.rser.2017.01.075 (2017).

(Continued)

*Primary Examiner* — Roger L Pang
(74) *Attorney, Agent, or Firm* — Jeremy J. Klobucar (57) ABSTRACT

Techniques for synchronizing shaft speeds of a hybrid powertrain of a hybrid vehicle include, during a first phase of a synchronization process, starting an engine using a first electric motor and increasing a speed of an output shaft of the engine to a first speed that is less than a second speed of an intermediate powertrain shaft on an opposing side of a disconnect clutch relative to the engine output shaft, and during a subsequent second phase of the synchronization process, performing a model-based determination of a target speed profile for the engine to follow from the first speed to the second speed and controlling the engine to increase its speed according to the target speed profile, and closing the disconnect clutch when the speeds of the engine output shaft and the intermediate powertrain shaft are synchronized.

16 Claims, 5 Drawing Sheets

(56) References Cited

U.S. PATENT DOCUMENTS

| | | | |
|---|---|---|---|
| 9,115,682 B2* | 8/2015 | Gibson | B60W 10/026 |
| 9,260,107 B2 | 2/2016 | Doering et al. | |
| 9,656,666 B2 | 5/2017 | Wang et al. | |
| 2009/0156355 A1* | 6/2009 | Oh | B60W 30/186 |
| | | | 903/946 |
| 2013/0297122 A1* | 11/2013 | Gibson | B60W 10/02 |
| | | | 180/65.265 |
| 2015/0211466 A1* | 7/2015 | Puri | F02N 11/0851 |
| | | | 701/22 |
| 2016/0046282 A1* | 2/2016 | Yamazaki | B60W 20/40 |
| | | | 180/65.265 |
| 2016/0137191 A1* | 5/2016 | Bang | B60W 20/40 |
| | | | 180/65.265 |
| 2021/0362581 A1* | 11/2021 | Shin | B60K 6/46 |

OTHER PUBLICATIONS

Dimauro, Luca, et al., "Torque Allocation of Hybrid Electric Trucks for Drivability and Transient Emissions Reduction", Department of Mechanical and Aerospace Engineering, Appl. Sci. 2023, 13, 3704. https://doi.org/10.3390/app13063704.

* cited by examiner

FIG. 4 ially relates to hybrid powertrain controls and, more particularly, to model-based engine speed profiling techniques for improved hybrid powertrain synchronization.

MODEL-BASED ENGINE SPEED PROFILING TECHNIQUES FOR IMPROVED HYBRID POWERTRAIN SYNCHRONIZATION

FIELD

The present application generally relates to hybrid powertrain controls and, more particularly, to model-based engine speed profiling techniques for improved hybrid powertrain synchronization.

BACKGROUND

One type of electrified powertrain includes an internal combustion engine separated from the remainder of the powertrain (e.g., an electric traction motor) by a disconnect clutch. During EV-only operation, the engine is disconnected from the powertrain by opening the disconnect clutch. During a transition to hybrid operation, the engine could be started by another electric motor (e.g., a belt-driven starter-generator, or BSG unit) and the engine's speed is synchronized with another powertrain shaft (e.g., the electric traction motor) before the disconnect clutch is closed. In low electric power authority conditions where the BSG is not powerful enough to accelerate the engine to a desired speed (the electric traction motor's speed), the engine must generate torque autonomously to accelerate and to track a speed reference before the disconnect clutch is closed. Conventional solutions to this problem include shaping the engine speed profile using heuristic (empirical calibration) approaches or feedback (e.g., proportional-integral-derivative, or PID) based controls, but these solutions are slow and inaccurate (thus resulting in noise/vibration/harshness, or NVH) that could be noticeable to a driver. Accordingly, while such conventional electrified powertrain control techniques do work for their intended purpose, there exists an opportunity for improvement in the relevant art.

SUMMARY

According to one example aspect of the invention, a control system for synchronizing shaft speeds of a hybrid powertrain of a hybrid vehicle is presented. In one exemplary implementation, the control system comprises a set of sensors configured to measure speeds of various shafts of the hybrid powertrain and a controller configured to perform a synchronization process for the hybrid powertrain including during a first phase of the synchronization process, starting an engine using a first electric motor and increasing a speed of an output shaft of the engine to a first speed that is less than a second speed of an intermediate powertrain shaft on an opposing side of a disconnect clutch relative to the engine output shaft, and during a subsequent second phase of the synchronization process, performing a model-based determination of a target speed profile for the engine to follow from the first speed to the second speed and controlling the engine to increase its speed according to the target speed profile, and close the disconnect clutch when the speeds of the engine output shaft and the intermediate powertrain shaft are synchronized.

In some implementations, the intermediate powertrain shaft is a second electric motor that is configured as a traction motor. In some implementations, the controller includes a linear quadratic integral (LQI) controller configured to model the target speed profile for the engine. In some implementations, the LQI controller includes gain scheduling with saturation and integral factor freeze. In some implementations, the controller is configured to perform the synchronization process in response to a request to transition the hybrid powertrain from an electric-only mode to a hybrid mode. In some implementations, the first electric motor has limited power capabilities such that the first electric motor is unable to increase the engine speed to the second speed. In some implementations, the first electric motor is part of a belt-driven starter-generator (BSG) unit. In some implementations, the controller is not configured to utilize empirical calibration data to estimate a target speed for controlling the engine speed. In some implementations, the controller is not configured to perform a feedback-based control of the engine speed.

According to another example aspect of the invention, a method for synchronizing shaft speeds of a hybrid powertrain of a hybrid vehicle is presented. In one exemplary implementation, the method comprises performing, by a control system of the hybrid vehicle, a synchronization process for the hybrid powertrain, the synchronization process including, during a first phase of the synchronization process, starting, by the control system, an engine using a first electric motor and increasing a speed of an output shaft of the engine to a first speed that is less than a second speed of an intermediate powertrain shaft on an opposing side of a disconnect clutch relative to the engine output shaft, and during a subsequent second phase of the synchronization process, performing a model-based determination of a target speed profile for the engine to follow from the first speed to the second speed and controlling the engine to increase its speed according to the target speed profile, and closing the disconnect clutch when the speeds of the engine output shaft and the intermediate powertrain shaft are synchronized.

In some implementations, the intermediate powertrain shaft is a second electric motor that is configured as a traction motor. In some implementations, the control system includes an LQI controller configured to model the target speed profile for the engine. In some implementations, the LQI controller includes gain scheduling with saturation and integral factor freeze. In some implementations, the performing of the synchronization process is in response to a request to transition the hybrid powertrain from an electric-only mode to a hybrid mode. In some implementations, the first electric motor has limited power capabilities such that the first electric motor is unable to increase the engine speed to the second speed. In some implementations, the first electric motor is part of a BSG unit. In some implementations, the control system is not configured to utilize empirical calibration data to estimate a target speed for controlling the engine speed. In some implementations, the control system is not configured to perform a feedback-based control of the engine speed.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As mentioned above, conventional engine speed synchronization solutions include shaping the engine speed profile using heuristic (empirical calibration) approaches or feedback (e.g., proportional-integral-derivative, or PID) based controls, but these solutions are slow and inaccurate (thus resulting in noise/vibration/harshness, or NVH that could be noticeable to a driver. More specifically, heuristic approaches require a high calibration effort, and several conditions and rules might be needed to generate a profile with satisfactory performance for all working conditions, and a simple PID cannot capture the dynamics of the system, i.e., due to the high nonlinearity of the hybrid powertrain and of the engine, a non-liner PID or a gain scheduling PID strategy might be necessary, which also requires very high calibration efforts.

Accordingly, improved techniques that utilize a model-based control scheme, such as linear quadratic integral (LQI) control, to optimize the engine speed profile to follow for intermediate powertrain shaft synchronization and disconnect clutch closure. In a supervisory controller, a clutch control block manages the shift execution, disconnect clutch, and engine start conditions. This block outputs a reference speed for an LQI control block, which models a desired speed profile. A final profile arbitration block utilizes this desired speed profile to generate engine speed/torque requests for controlling the engine accordingly. Potential benefits include reduced NVH and faster response (i.e., a quicker engine speed synchronization and disconnect clutch closure).

Figure 1:
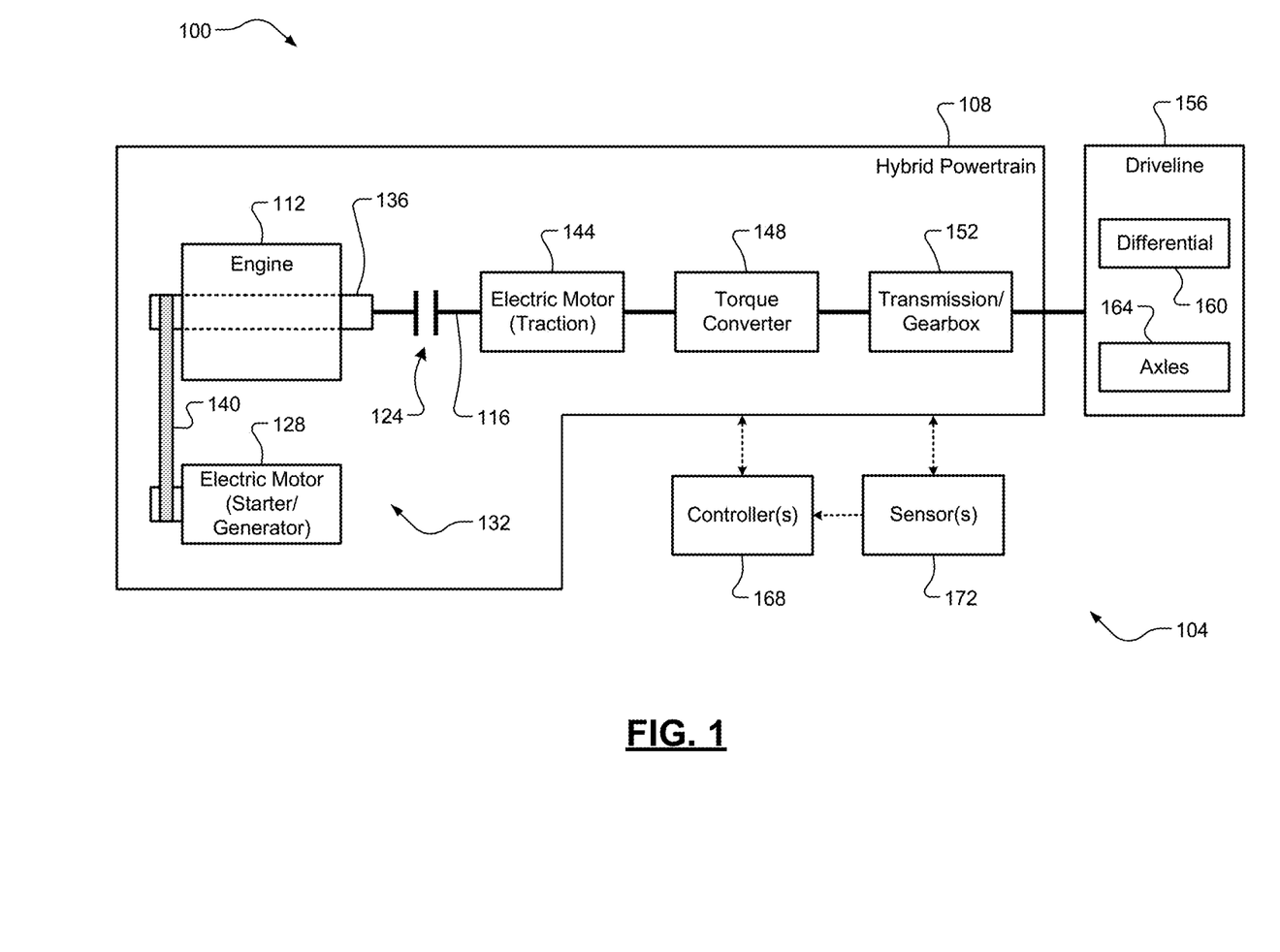
FIG. 1 is functional block diagram of a hybrid vehicle having an example hybrid powertrain and an example control system for the hybrid powertrain according to the principles of the present application.

Referring now to FIG. 1, a functional block diagram of a hybrid vehicle 100 having an example control system 104 for an example hybrid powertrain 108 according to the principles of the present application is illustrated. The hybrid powertrain 108 generally comprises an internal combustion engine 112 that is selectively connected in series with an intermediate powertrain shaft 116 via a disconnect clutch 124 arranged therebetween. The engine 112 has a first electric motor 128 associated therewith for starting the engine 112 (e.g., during start/stop operation or mode transitions).

In one exemplary implementation, the first electric motor 128 is part of a belt-driven starter-generator (BSG) unit 132 where the first electric motor 128 is coupled to the engine 112 (e.g., the flywheel or crankshaft 136) via a belt, chain, or other suitable drive device 140. This intermediate powertrain shaft 116 could be, for example, a shaft of a second electric motor 144 that is configured as a traction motor (i.e., generating drive torque for vehicle propulsion). Other components of the hybrid powertrain 108 could include a fluid coupling or torque converter 148 and a transmission or gearbox 152. The hybrid powertrain 108 is connected to a driveline 156, which could include components such as a differential 160, half-shafts or axles 164, and the like.

Figure 3A:
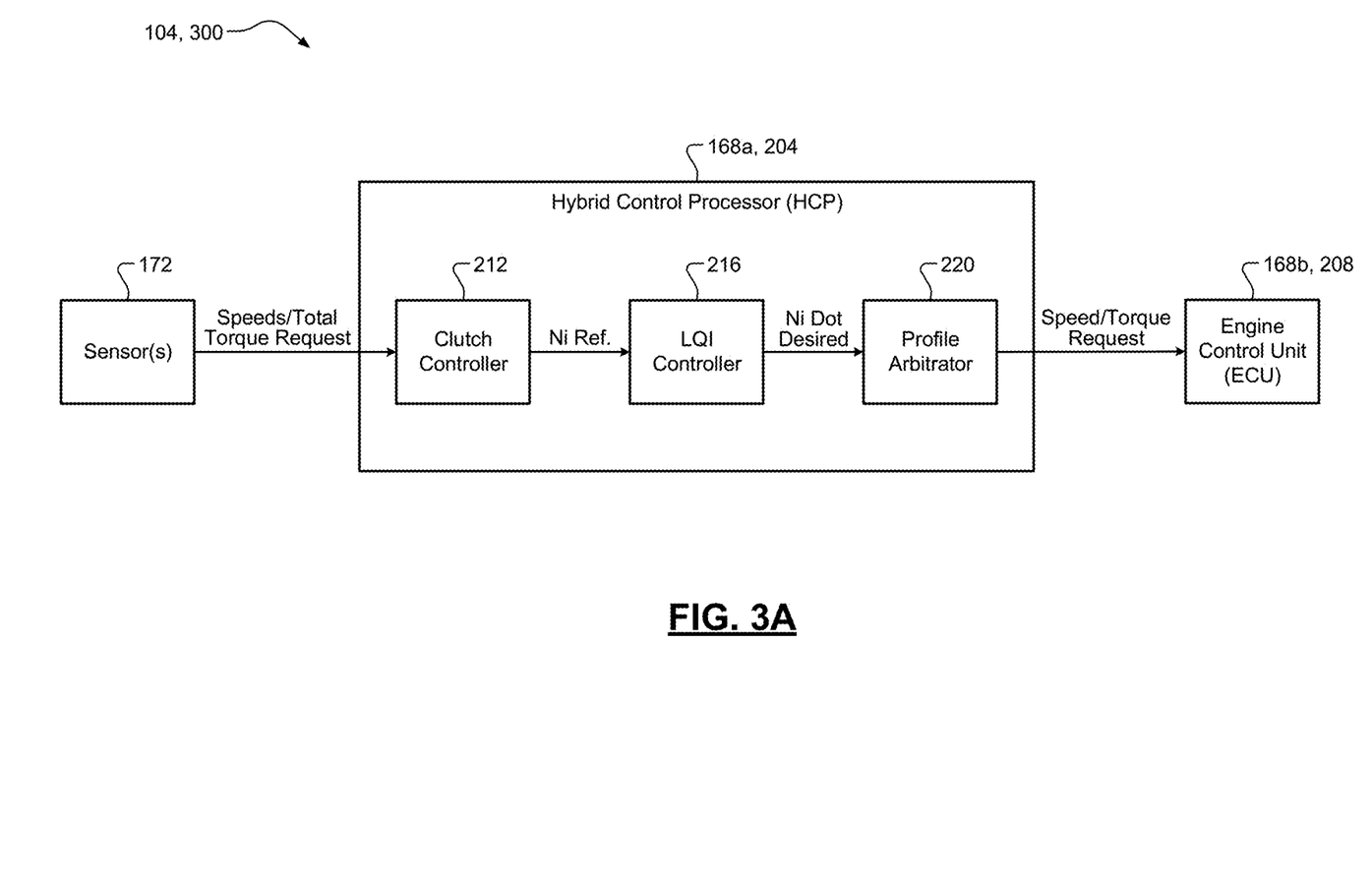
FIGS. 3A-3B are functional block diagrams of example architectures for a hybrid control processor (HCP) and a linear quadratic integral (LQI) controller according to the principles of the present application.

The control system 104 generally comprises one or more controllers 168 and a set of one or more sensors 172. As shown, the one or more controllers 164 could include a supervisory controller, such as a hybrid control processor (HCP), and an engine control unit (ECU), which are shown in FIG. 3 and discussed in greater detail below. The sensor(s) 172 include speed sensors for the various shafts of the hybrid powertrain 108 including, but not limited to, speeds of the shafts 136, 140 on opposing sides of the disconnect clutch 124. It will be appreciated that the sensor(s) 168 could include any other suitable sensors, such as torque/pressure sensors, temperature sensors, and the like.

As illustrated, the hybrid powertrain 108 is configured as a series hybrid when the disconnect clutch 124 is open and as a parallel hybrid when the disconnect clutch 124 is closed. In an electric-only mode, the disconnect clutch 124 is open and the second electric motor 144 is utilized to satisfy torque requests, such as a driver torque request via a driver interface (not shown; e.g., an accelerator pedal). The hybrid powertrain 108 could be transitioned to a hybrid mode, such as in situations where the torque request cannot be satisfied by the second electric motor 144 alone. During the electric-only to hybrid mode transition, speed synchronization of the engine 112 or crankshaft 136 with the intermediate powertrain shaft 116 or second electric motor 144 must occur before the disconnect clutch 124 can be closed.

Figure 2:
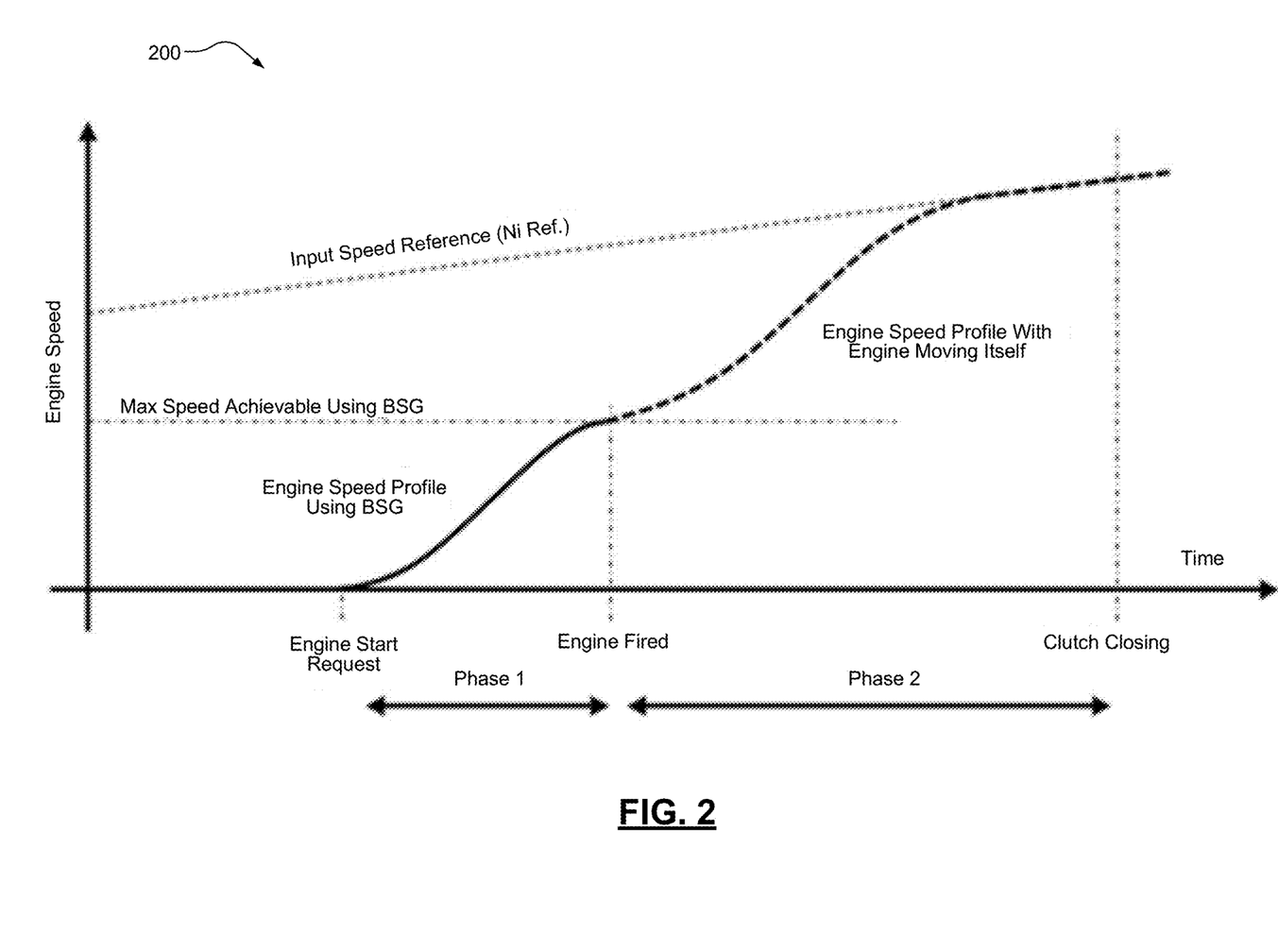
FIG. 2 is an example plot of engine speed and an intermediate powertrain shaft reference speed during two phases of a synchronization process according to the principles of the present application.

Referring now to FIG. 2 and with continued reference to FIG. 1, an example plot 200 of engine speed and an intermediate powertrain shaft reference speed during two sequential phases of a synchronization process according to the principles of the present application is illustrated. The plot 200 illustrates example an example engine speed curve, engine speed profile (to be tracked/followed), and a speed references (e.g., each in revolutions per minute, or RPM; the y-axis) with respect to time (the x-axis). As shown in FIG. 2, when an engine start is requested, such as in response to an electric-only to hybrid mode transition for the hybrid powertrain 108, the first electric motor 128 or BSG 132 starts accelerating the engine 112 during the first phase (Phase 1) of the synchronization process. Once the limit speed of the first electric motor 128 or BSG 132 is reached, the engine 112 is fired (i.e., fuel/air combustion begins), and the engine 112 begins generating power to reach and track the reference speed in the subsequent second phase (Phase 2). During this second phase (Phase 2), there is a need to shape the engine speed and engine torque requests sent to the ECU to facilitate the tracking of such a speed profile. Considerations on engine torque capability and dynamics also need to be in place to guarantee a high quality execution.

Referring now to FIG. 3A, a functional block diagram of an example architecture 300 for the control system 104 according to the principles of the present application is illustrated. The goal of the control system 104, 300 is to generates an optimal acceleration/torque command for the engine 112 to accelerate itself to the target speed profile within given limits and considering actuation lag and dynamics while utilizing minimal control effort. During the above-described second phase (Phase 2) of the synchronization process, a model-based control scheme or controller can be utilized to optimize the engine speed profile to be followed. An LQI control methodology or controller is specifically proposed herein, which contains a simplified model of the delays and dynamics of the engine 112, constraints on the allowable torque command (engine speed variations), and anti-windup logic. The engine model is a simple two-state linear switching system, in which system matrices are created offline for a set of working conditions and are dependent on the powertrain state (i.e., clutches open vs. closed). A gain scheduling approach is used for the LQI gains which are computed offline using any suitable approaches. Specifically, the state space is augmented to include an integral term on the engine speed. This guarantees perfect regulation at steady state.

One note is that the LQI provides a "delta torque," i.e., a variation term that is added to the total torque produced by the engine and not an absolute torque. Generally, the engine 112 will provide a torque that can be used for several tasks such as auxiliary load powering and battery recharging. The LQI focuses on the additional torque to move the engine speed. This also justifies the use of linear switching models. As shown, the torque supervisory control is handled by the HCP 204, which oversees the allocation of torque and definition of speeds for all the torque actuators, i.e., engine 112 and electric motors 128, 144. Within the HCP 204, a clutch controller 212 manages the shift execution, disconnect clutch, and engine start conditions based on various input parameters, such as a driver torque request and hybrid powertrain shaft speeds (e.g., from sensor(s) 172). An LQI controller 216 generates a desired speed profile based on the specific working condition and dynamics of the engine 112. Finally, a profile arbitrator 220 finalizes the speed request by adding specific constraints to generate/output speed/torque requests. The ECU 208 is then responsible for controlling the engine 112 to follow the defined speed and torque profiles using the set of available actuators, i.e., throttle (air), fuel, spark timing, valve timing, etc.

Figure 3B:
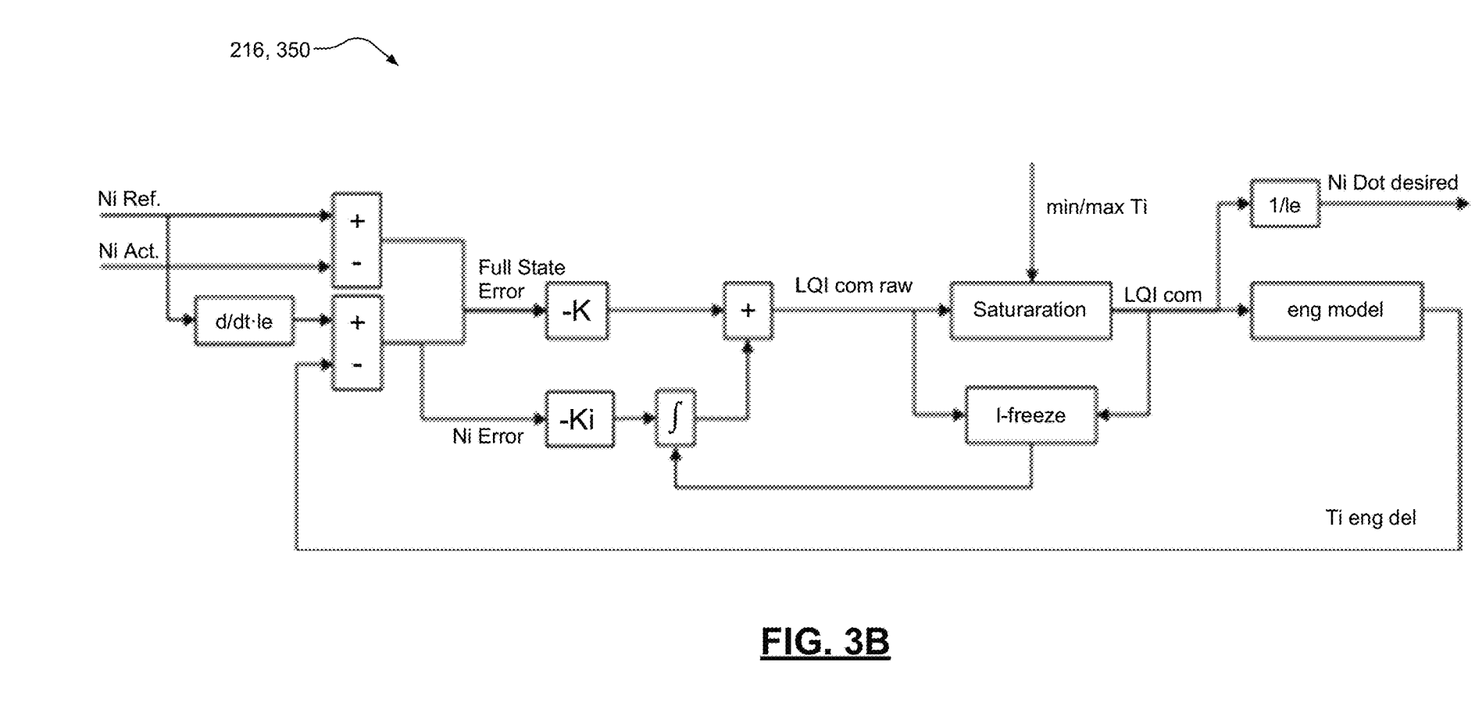

Referring now to FIG. 3B, a functional block diagram of an example architecture 350 for the LQI controller 216 according to the principles of the present application is illustrated. In the illustrated architecture 250, Ni Ref. represents the desired engine speed and Ni Act. represents the actual (measured) engine or crankshaft/flywheel speed. An operation (d/dt*Ie) represents the operation needed to compute the torque reference from the speed reference or, more specifically, the derivative of the engine speed reference and multiplication to the equivalent engine inertia Ie. Note that the equivalent inertia can change based on the powertrain state (which hybrid powertrain clutches are open/closed). The full state error represents the error between the reference and the actual value of the speeds and the torques.

As previously mentioned, the proposed LQI methodology utilizes a gain scheduling approach, where K and Ki gains of the LQI and are computed using any suitable procedures for LQI gain scheduling strategy. More specifically, the state space is augmented to include an integral term—in this case, the engine speed error. Note that these gains are computed offline for a set of different conditions, and then are selected online based on the current working conditions of the hybrid powertrain 108. Also shown in the example architecture are Min/Max Ti, which represents the minimum/maximum torque constraints. In this case, these torque constraints represent how much capacity is available by the engine 112 to move itself.

These constraints could be computed as follows: (1) Max Ti=maximum engine capability at the current working condition minus torque currently being used; and (2) Min Ti=minimum engine capability at the current working condition minus torque currently being used. The term "LQI com raw" represents the LQI command before saturation, and a saturation logic is used to guarantee the command is within the constraints. The integral freeze or "I-freeze" as shown represents the proposed main anti-windup logic used, which "freezes" the integral term whenever one of the constraints is active. A back calculation (not specifically shown) could use the output of the engine model as pre-saturation (Ti eng del) and the actual profile used by the ECU 208 as the post-saturation value (i.e., the engine speed request) are converted into the appropriate domain(s). The back calculation gains could also computed using a gain scheduling approach. It will be appreciated that other anti-windup logic could also or alternatively be applied but is not specifically shown due to space/complexity limitations.

As shown, LQI com is the torque commanded by the LQI after the saturations have been applied, the function (1/Ie) is the operation used to transform the torque command from LQI into an acceleration that describe the optimal Ni profile, eng model is the engine delay model (in this case, a linear switching model with two states—engine airflow dynamics and shaft dynamics). The system matrices are updated based on the hybrid powertrain working conditions to guarantee a high quality representation using this simple solution. Tieng del is the predicted actual torque from the engine after the delay model.

Figure 4:
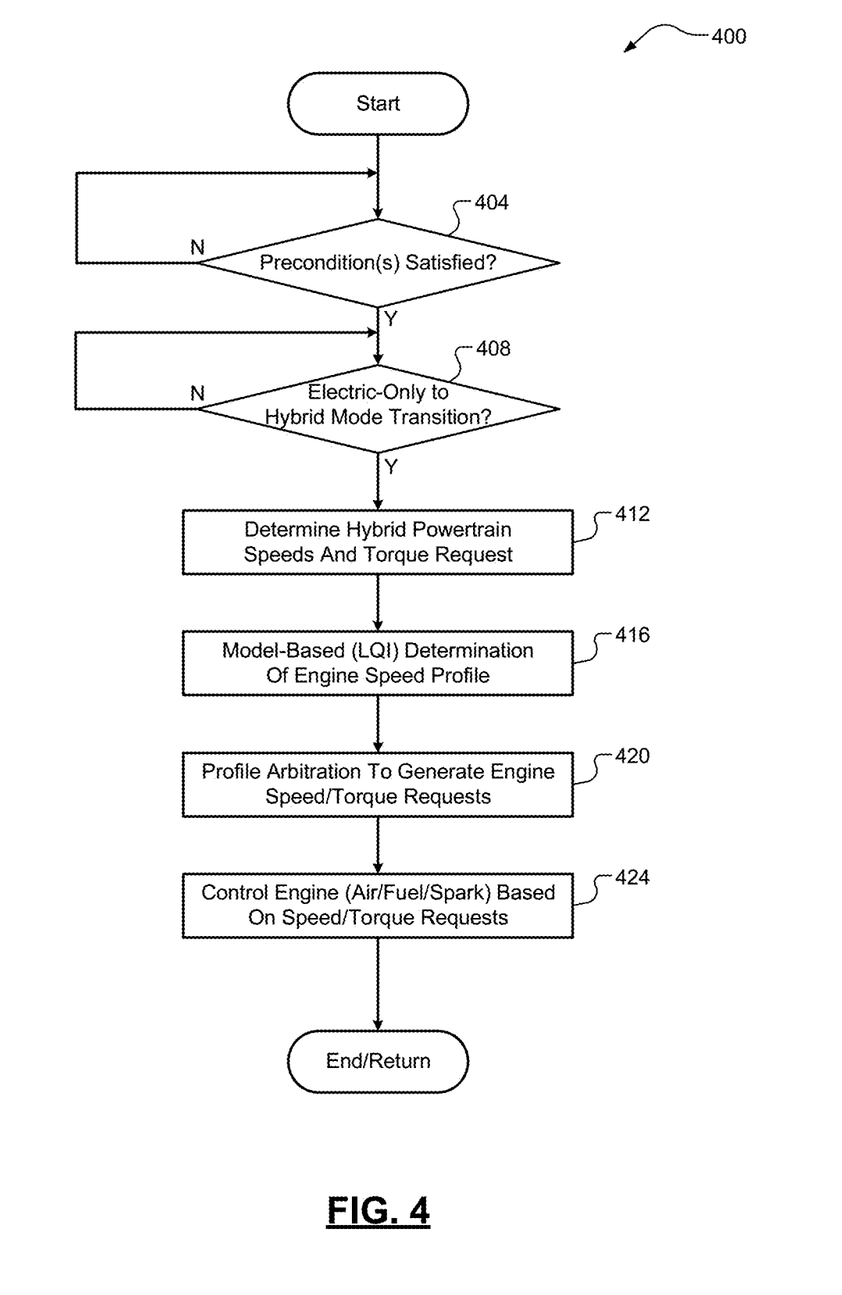
FIG. 4 is a flow diagram of an example method for synchronizing shaft speeds of a hybrid powertrain of a hybrid vehicle upon an engine start according to the principles of the present application.

Referring now to FIG. 4, a flow diagram of an example method 400 for determining and utilizing an engine speed profile to synchronize an engine with an intermediate powertrain shaft according to the principles of the present application is illustrated. The method 400 of FIG. 4 generally represents the flow of information and not different steps done at different times. While the hybrid vehicle 100 and its components are specifically referenced for illustrative/descriptive purposes, it will be appreciated that the method 400 could be applicable to any suitably configured hybrid vehicle. Beginning at optional 404, the control system 104 determines whether a set of one or more preconditions are satisfied. These precondition(s) could include, for example, the hybrid powertrain 108 being powered up and running and operating in an electric-only mode. Other non-limiting examples of these precondition(s) could include there being no malfunctions or faults present that would inhibit or otherwise negatively impact the techniques of the present application. Some non-limiting examples of these malfunctions/faults include electric motor malfunctions, engine or engine torque actuator malfunctions, hybrid powertrain clutch malfunctions, and the like. When false, the method 400 ends or returns to 404. When true, the method 408 continues to 404.

At 408, the control system 104 (the HCP 204) determines whether an electric-only to hybrid mode transition for the hybrid powertrain 108 is requested. This could be detected, for example only, when the driver torque request exceeds an amount of drive torque that the electric motor 144 is capable of generating/satisfying itself and without the help of the engine 112. When false, the method 400 returns to 408. When true, the method 400 proceeds to 412. At 412, the control system 104 (the HCP 204) determines the current state of the hybrid powertrain 108 (e.g., measured shaft speeds from sensor(s) 172 and clutch open/closed states) and a total torque request for the hybrid powertrain (e.g., based on a driver torque request). At 416, the control system 104 (the HCP 204) performs a model-based (e.g., LQI-based) determination of an engine speed profile. At 420, the control system 104 arbitrates the engine speed profile to generate/output speed and torque requests for controlling the engine 112. At 424, the control system 104 (the ECU 208) controls the engine 112 (more specifically, its torque actuators, such as air/fuel/spark) based on these speed/torque requests, which causes the engine's speed to follow and track the engine speed profile as desired. The method 400 then ends or returns to 404.

While the method 400 is specifically described in relation to an engine start procedure (e.g., an electric-only, or series hybrid, to parallel hybrid mode transition) during the driving of the hybrid vehicle 100, it will be appreciated that the techniques of the present application are also applicable to other vehicle working conditions, such as controlling the engine speed when electric authority is not available during electric only (series hybrid) operation.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for synchronizing shaft speeds of a hybrid powertrain of a hybrid vehicle, the control system comprising:
    a set of sensors configured to measure speeds of various shafts of the hybrid powertrain; and
    a controller configured to perform a synchronization process for the hybrid powertrain including:
        during a first phase of the synchronization process:
            starting an engine using a first electric motor, and
            increasing a speed of an output shaft of the engine to a first speed that is less than a second speed of an intermediate powertrain shaft on an opposing side of a disconnect clutch relative to the engine output shaft; and
        during a subsequent second phase of the synchronization process:
            performing a model-based determination of a target speed profile for the engine to follow from the first speed to the second speed, wherein the controller includes a linear quadratic integral (LQI) controller configured to model the target speed profile for the engine, and
            controlling the engine to increase its speed according to the target speed profile; and
        closing the disconnect clutch when the speeds of the engine output shaft and the intermediate powertrain shaft are synchronized.

2. The control system of claim 1, wherein the intermediate powertrain shaft is a second electric motor that is configured as a traction motor.

3. The control system of claim 1, wherein the LQI controller includes gain scheduling with saturation and integral factor freeze.

4. The control system of claim 1, wherein the controller is configured to perform the synchronization process in response to a request to transition the hybrid powertrain from an electric-only mode to a hybrid mode.

5. The control system of claim 1, wherein the first electric motor has limited power capabilities such that the first electric motor is unable to increase the engine speed to the second speed.

6. The control system of claim 5, wherein the first electric motor is part of a belt-driven starter-generator (BSG) unit.

7. The control system of claim 1, wherein the controller is not configured to utilize empirical calibration data to estimate a target speed for controlling the engine speed.

8. The control system of claim 1, wherein the controller is not configured to perform a feedback-based control of the engine speed.

9. A method for synchronizing shaft speeds of a hybrid powertrain of a hybrid vehicle, the method comprising:
    performing, by a control system of the hybrid vehicle, a synchronization process for the hybrid powertrain, the synchronization process including:
        during a first phase of the synchronization process:
            starting an engine using a first electric motor, and
            increasing a speed of an output shaft of the engine to a first speed that is less than a second speed of an intermediate powertrain shaft on an opposing side of a disconnect clutch relative to the engine output shaft; and
        during a subsequent second phase of the synchronization process:
            performing a model-based determination of a target speed profile for the engine to follow from the first speed to the second speed, wherein the control system includes a linear quadratic integral (LQI) controller configured to model the target speed profile for the engine, and
            controlling the engine to increase its speed according to the target speed profile; and
    closing, by the control system, the disconnect clutch when the speeds of the engine output shaft and the intermediate powertrain shaft are synchronized.

10. The method of claim 9, wherein the intermediate powertrain shaft is a second electric motor that is configured as a traction motor.

11. The method of claim 9, wherein the LQI controller includes gain scheduling with saturation and integral factor freeze.

12. The method of claim 9, wherein the performing of the synchronization process is in response to a request to transition the hybrid powertrain from an electric-only mode to a hybrid mode.

13. The method of claim 9, wherein the first electric motor has limited power capabilities such that the first electric motor is unable to increase the engine speed to the second speed.

14. The method of claim 13, wherein the first electric motor is part of a belt-driven starter-generator (BSG) unit.

15. The method of claim 9, wherein the control system is not configured to utilize empirical calibration data to estimate a target speed for controlling the engine speed.

16. The method of claim 9, wherein the control system is not configured to perform a feedback-based control of the engine speed.

* * * * *